Dec. 1, 1970  P. W. BLESS ET AL  3,544,793
PORTABLE NUCLEAR MEASURING GAUGE PROVIDING MULTIPLE
RADIATION AND DETECTING POSITIONS
Filed Dec. 11, 1967  5 Sheets-Sheet 1
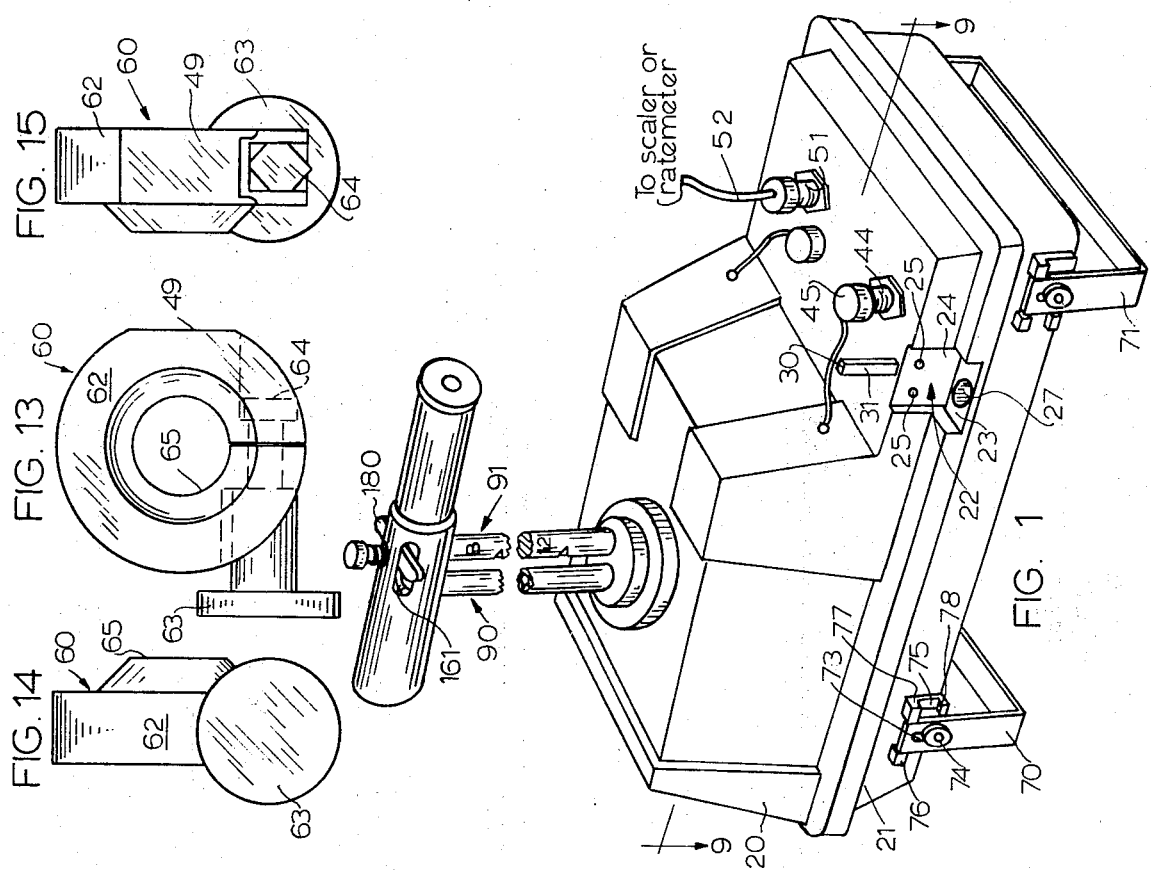
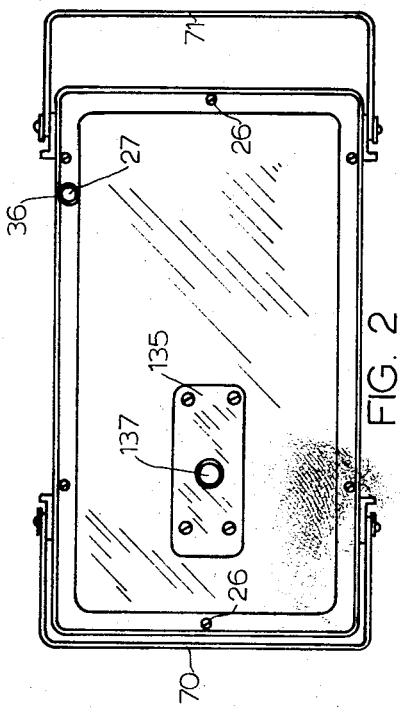
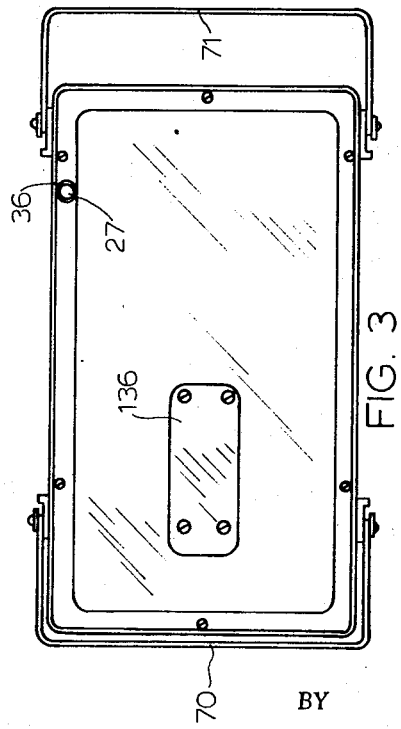
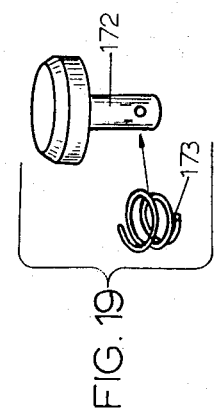
INVENTORS
Paul W. Bless
Richard F. Clements
BY B. B. Olive
ATTORNEY

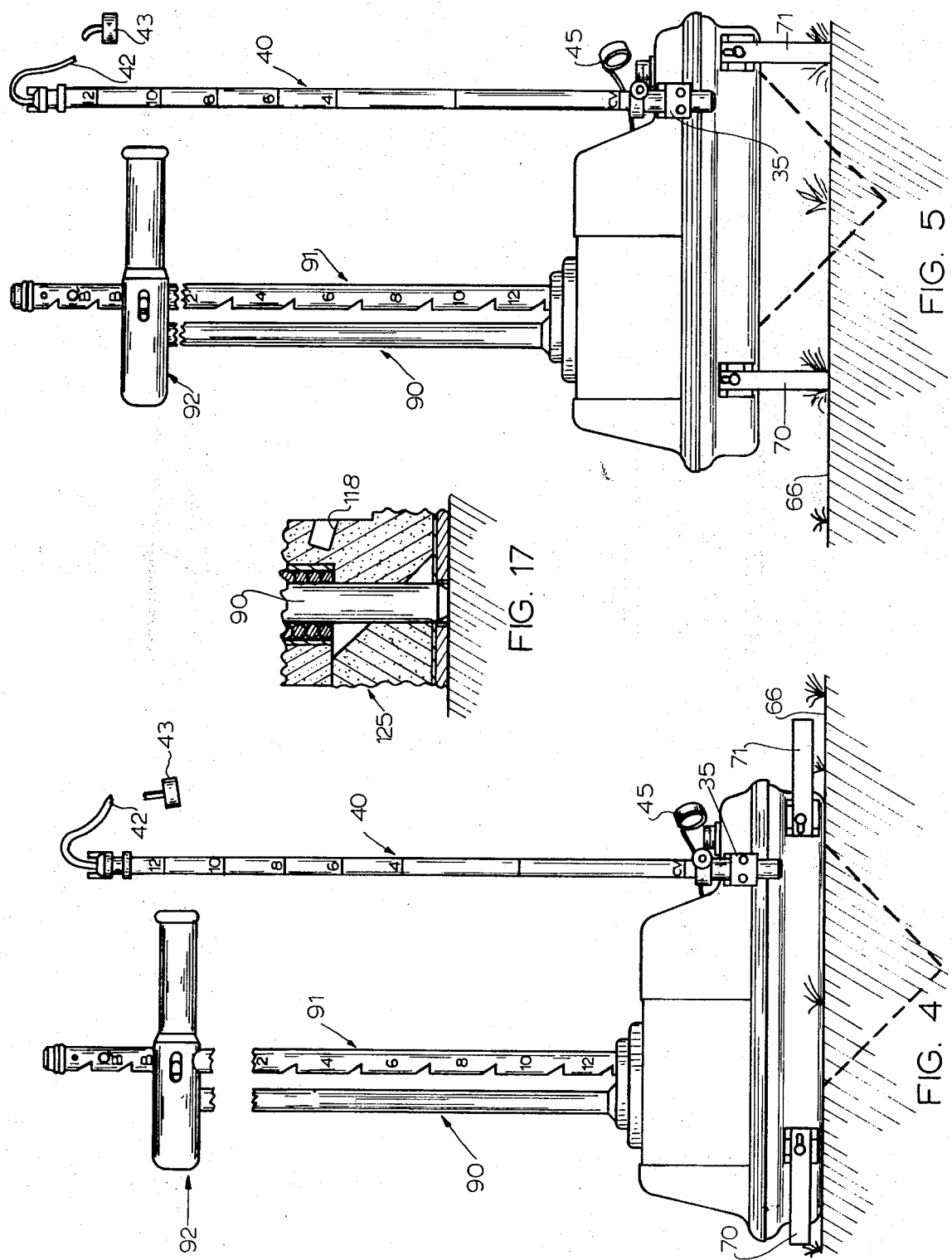

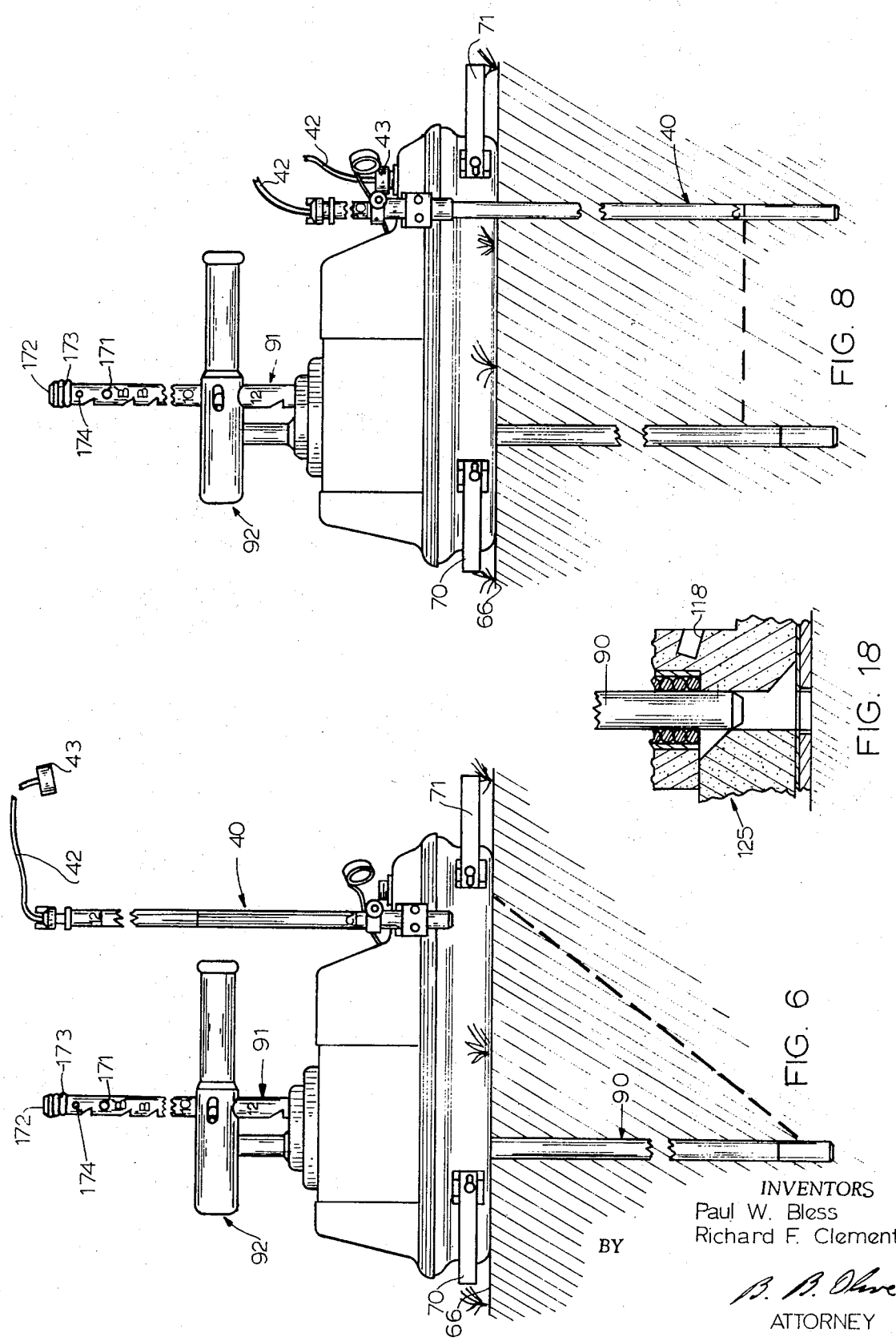

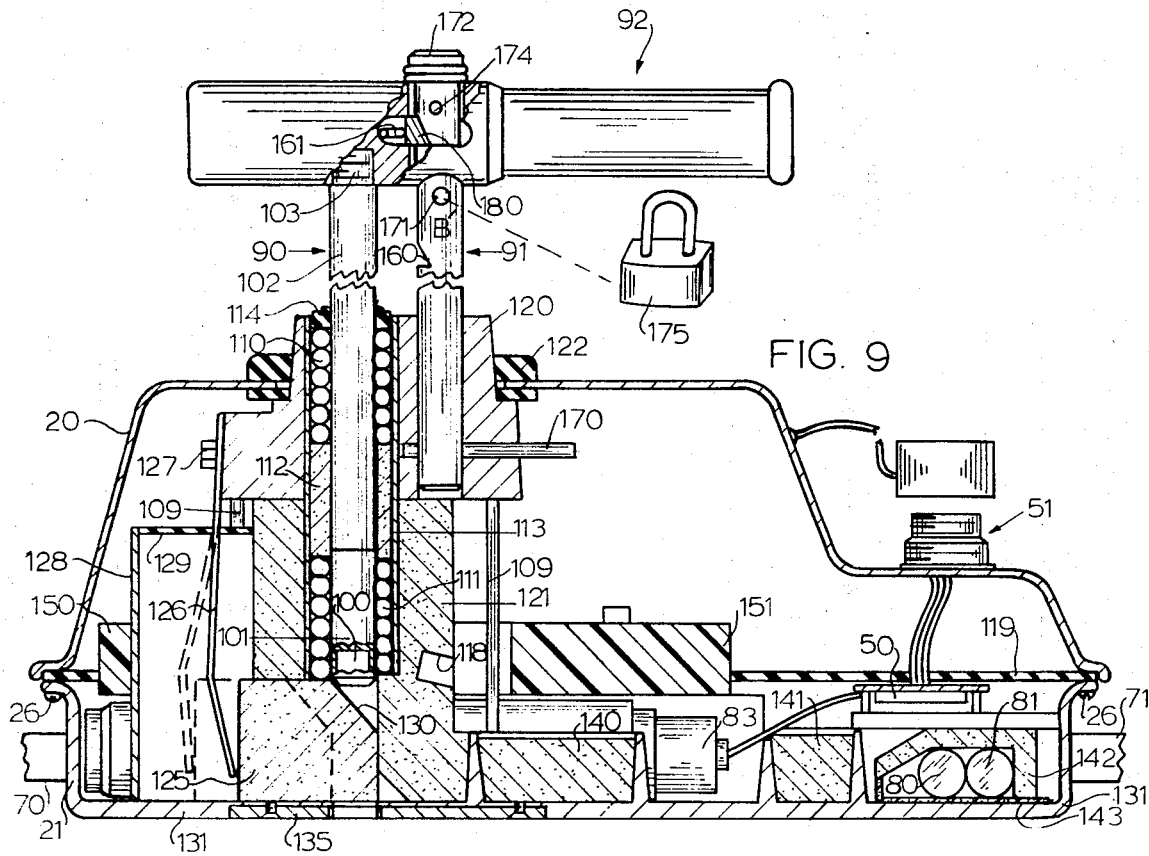
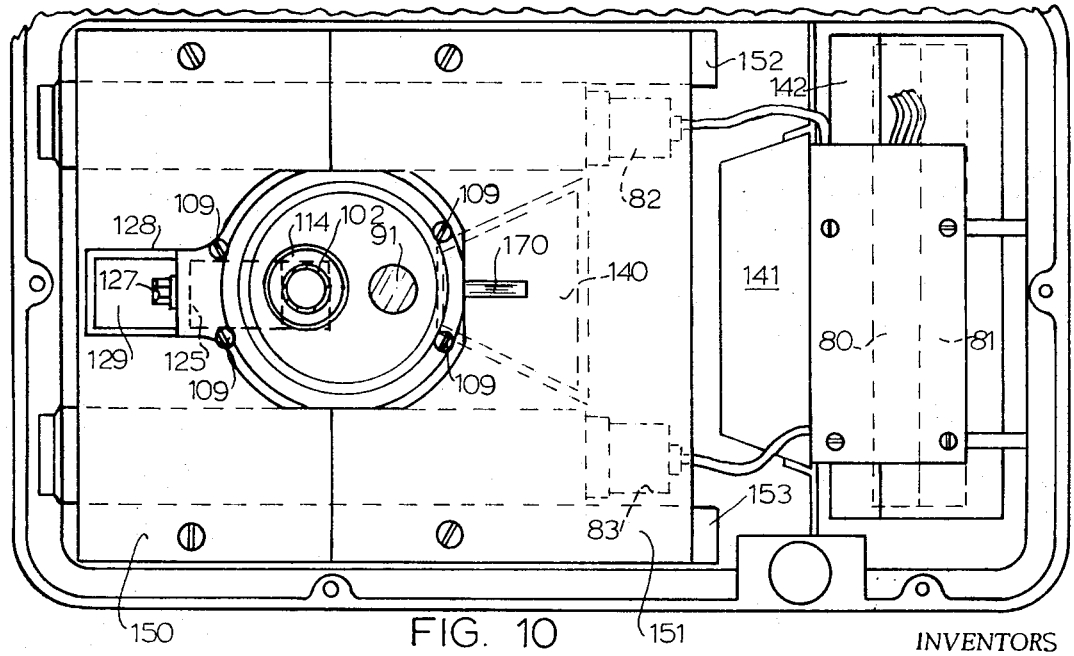
FIG. 9
FIG. 10
INVENTORS
Paul W. Bless
Richard F. Clements
BY
B. B. Olive
ATTORNEY

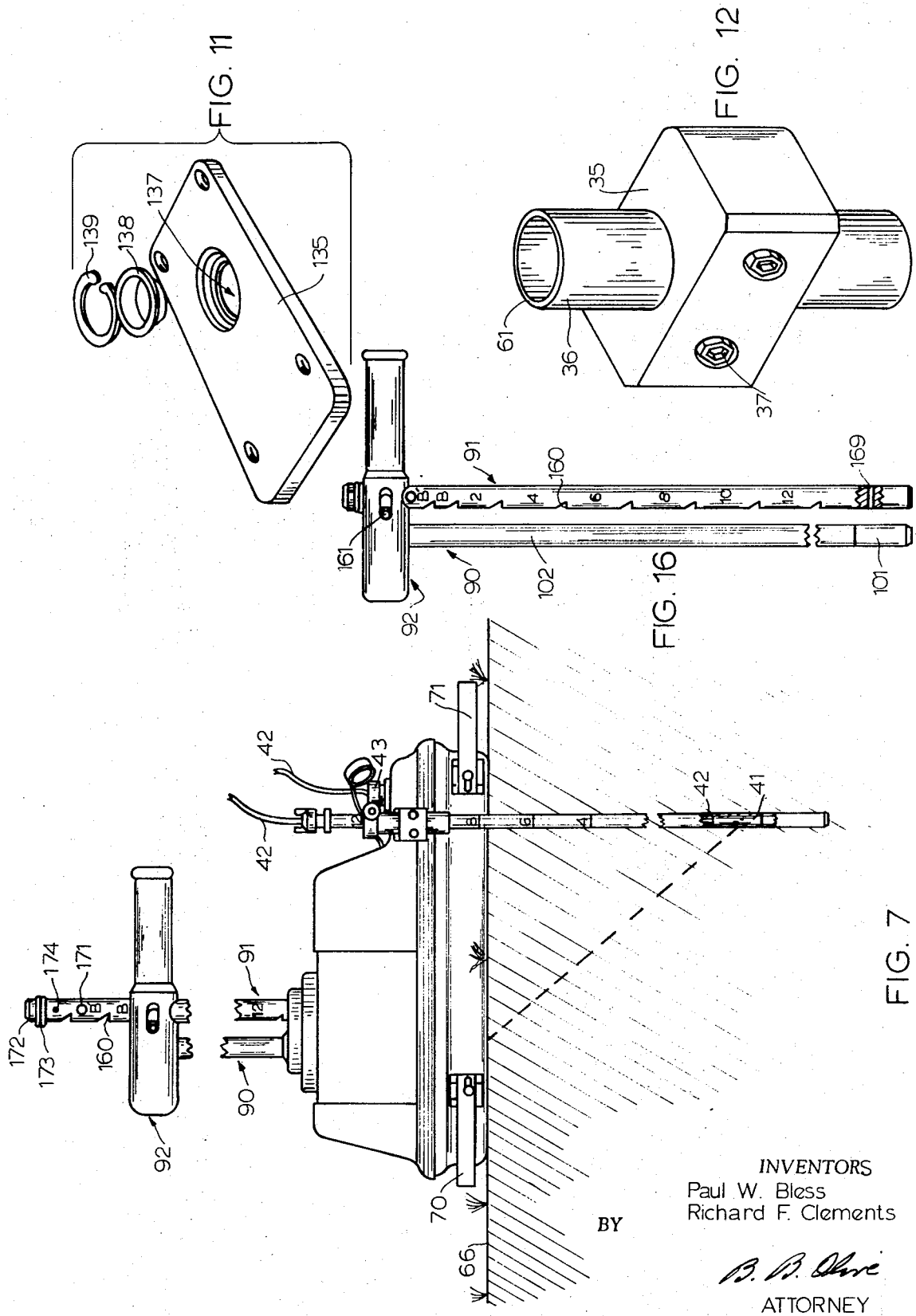

United States Patent Office 3,544,793
Patented Dec. 1, 1970

3,544,793
PORTABLE NUCLEAR MEASURING GAUGE PROVIDING MULTIPLE RADIATION AND DETECTING POSITIONS
Paul W. Bless, Durham, and Richard F. Clements, Raleigh, N.C., assignors to Troxler Electronic Laboratories, Inc., Raleigh, N.C., a corporation of North Carolina
Filed Dec. 11, 1967, Ser. No. 689,530
Int. Cl. G01t 1/18
U.S. Cl. 250—83.6                                    9 Claims

ABSTRACT OF THE DISCLOSURE

A portable nuclear measuring gauge enables material characteristics such as those related to density and moisture to be determined with both backscatter and direct transmission techniques and with source radiation and radiation detection each being obtainable at above surface and plural subsurface positions.

RELATED APPLICATIONS

This application is related to and constitutes an improvement over Pat. 3,353,023 "Safety Shielding Structure for Portable Nuclear Gauge" issued Nov. 17, 1967, pending application Serial 560,396 "Safety Handle and Probe for Portable Surface Gauge Using Radioactive Source" filed Jan. 20, 1966 now Pat. 3,372,280 and pending application Ser. 422,796 "Handle-Probe Construction for Portable and Subsurface Density Gauge Using Radioactive Source," filed Dec. 31, 1964 now Pat. 3,372,281.

BACKGROUND OF THE INVENTION

Field of the invention

The invention deals generally with gauges for measuring physical characteristics of material but more particularly with those gauges equipped to establish nuclear radiation through the material and to detect backscatter radiation from the material as a means of determining the desired characteristics. The invention furthermore deals with a nuclear measuring gauge providing for both gamma and neutron source radiation, for source as well as detector surface and subsurface operating positions and for utilization of both direct transmission and backscatter techniques. Safety and structural features of the invention also relate to the source rod, to the source rod guiding and indexing, to the handle and shielding structure and to the arrangement of fixed internal and of movable external detectors.

Description of the prior art

Typical prior art is to be found in the mentoned patent and co-pending applications. Other typical related prior art includes Russian Pat. 125,695, U.S. Pat. 3,126,484 and 2,781,453. So far as this invention is concerned it may be said that the prior art has generally been directed to gauges to perform according to a particular technique such as being designed primarily for use of the backscatter technique with neutron moderation and with the neutron source and detector always in particular above surface positions. Another example might be a gauge designed only for use of the direction transmission technique with the detector always being in an above surface position and the gamma source, when radiating for measuring purposes, always being in one of several subsurface positions. Some gauges have been useful only for gamma and density measuring whereas others have been useful only for neutron moderation and moisture measuring. The prior art gauges while recognizing the need for overcoming the so-called "chemical effect" have not provided any simple means for elevating the gauge as required to reduce the effect by using the air gap technique. Prior art such as illustrated by Patent 2,781,453 teach locating the source immediately next to the bottom wall during backscatter measuring. The effect of surface roughness is reduced by having the source slightly above the bottom wall and within the shielding so as to partially collimate the rays. However, to date the art has not produced a gauge adapted to give the operator an easy choice, during backscatter measuring, of having the source either in a non-collimated or partially collimated position.

Prior art portable gauges of the type provided by this invention have lacked any facility for lowering both source and detector to the same subsurface level so as to be able to measure by direct transmission at such level. Absolutely precise and repeatable positioning of the test elements has been difficult to obtain with some of the prior art constructions. From a manufacturing viewpoint the nature of prior gauges has required the manufacturer to stock gauges for each particular user's requirements. There has been lacking a basic design from which with minor alterations the manufacturer could make up whatever type of portable nuclear measuring gauges was required for the particular application. Also, with subsurface gauges having the source mounted in a rod and indentations formed on the source rod itself for holding the rod at various elevations there has arisen an inherent design conflict since the function of the rod as a source holder and shield for the source requires design consideration in choice of construction and materials employed which are not necessarily compatible with the design considerations which control when the rod is considered as functioning as an index device for the purpose of being able to hold the source at any of several subsurface positions. Furthermore, where the source rod surface itself is irregular because of the presence of positioning indentations it means that any movable safety shielding through which the source rod passes when being lowered to subsurface positions must accommodate to any foreign matter, e.g. dirt, small rock, adhering to the indentations and to whatever scraping action is established by the rod indentations being moved through the safety shielding. The fact that the indexing indentations have been formed on the body of the source rod has meant that the source rod has had to be made of somewhat soft, machineable material whereas for the purpose of maintaining precision travel the source rod should be of a substantially hard and non-machineable material. Conventional source rods have tended to wear excessively and to wobble after extensive use so as to introduce errors. The prior art constructions have prevented any practical use of precision bearing surfaces within the shielding for guiding the source rod so as to be able to maintain a precision measuring capability even after extensive use.

SUMMARY OF THE INVENTION

A portable nuclear measuring gauge according to the feature incorporates a basic structure which with minor modifications allows the basic structure to assume any of the following modes of operation:

(a) backscatter gauge for density or relative density
(b) direct transmission density gauge
(c) combination backscatter density and neutron moderation gauge
(d) combination backscatter and direct transmission density gauge
(e) combination backscatter density, direct transmission density and neutron moderation gauge
(f) combination backscatter density and neutron moderation gauge with direct transmission subsurface detector capability (g) partially collimated backscatter gauge The preferred basic structure incorporates a source rod which presents a smooth, unbroken outer cylindrical surface and which is mounted in a precision bearing located in a major shielding block so as to maintain absolute and precise vertical alignment with respect to the detecting elements. The source rod preserves the radiation pattern by being non-rotatable around its own axis and is guided by a completely separate and fixed guide rod on which the positioning indentations are precisely formed and located and which because of its fixed position is never required to be moved through any of the required safety shielding nor into any subsurface positions. Corresponding detent means are provided in a handle which is secured to and moves the source rod up and down. The handle can be held at any indexing position and the source at any operating position corresponding to any of the indentations on the guide rod. The structure further provides a laterally movable, spring loaded minor shielding block below the source rod and the detent means and indentations are arranged so that the minor shielding block always assumes a safe shielding position whenever any attempt is made to carry the gauge by lifting on the handle.

The internal shielding is arranged such that either backscatter or direct transmission techniques may be employed and both neutron as well as gamma detectors are provided internally of the gauge housing and in fixed positions. For backscatter techniques the gauge bottom may assume the form of being an unbroken wall or substantially unbroken such that radiation may pass and be detected back through the bottom wall of the gauge. In one embodiment the bottom wall has an open section for installation of either a solid plate or an aperture plate depending on whether the gauge is to be used as a subsurface gauge. The basic structure, readily accommodates to the source rod and guide rod to be manufactured according to whether the gauge is intended to be employed for applications in which the source is in an above surface position and the source rod and guide rod are relatively short or in applications in which the source rod and guide rod are relatively long and allow for the source to move to subsurface positions. In the latter applications it will also be appreciated that the bottom surface of the gauge necessarily includes an aperture through which the source rod travels.

As has been indicated by the enumerated applications, the basic structure adapts to employment of a composite material for the source which is capable of emitting both neutron as well as gamma radiation thereby giving the gauge the measuring capability of both forms of radiation.

The housing of the basic structure is modified from the customary housing in that accommodation is made for mounting an auxiliary detector probe which can be lowered to various subsurface positions thereby enabling gamma detection to be accomplished at subsurface as well as above surface positions with the same basic gauge.

The gauge of the invention also includes in the housing means for electrically converting the output of any of the various fixed and movable detectors to signals suitable for input to an external scaler or ratemeter.

Thus, the object of the invention is generally that of overcoming the described shortcomings of the prior art gauges and to provide a basic gauge structure having the described versatility.

Another object is to provide a gauge having an improved adjustably positionable source rod the structure of which does not require indexing indentations or the like on its surface.

Another object is to provide in the same gauge both an adjustably positionable source and an adjustably positionable detector.

A further object is to provide a partially fixed, partially moving shielding arrangement and detectors and sources coordinated with such shielding such that gamma backscatter, gamma direct transmission and neutron moderation measuring in both above surface and subsurface modes may all be accomplished with the same gauge.

Another object is to provide a gauge adapted to both partially collimated and non-collimated backscatter source positioning.

Another object is to provide means carried by the gauge itself for supporting the gauge some predetermined elevation above the surface of the material being measured for reducing the so-called chemical effect by using the air gap technique.

The foregoing and other objects will become apparent from later description and the drawings:

DESCRIPTION OF THE DRAWINGS

FIG. 1 is a perspective view of a gauge incorporating the invention with the auxiliary detector probe removed, with the handle being shown in a carrying position and with the auxiliary legs in a supporting position.

FIG. 2 is a bottom view showing a cover plate having an opening arranged for movement of the source rod through the gauge bottom.

FIG. 3 is similar to FIG. 2 but showing a solid cover plate arranged to provide a substantially unbroken bottom surface.

FIG. 4 is a side elevation showing the gauge arranged for a backscatter measurement and with the gauge bottom in contact with the material surface.

FIG. 5 is similar to FIG. 4 but showing the gauge elevated by the auxiliary support legs.

FIG. 6 is similar to FIG. 4 but showing the source rod in a subsurface position.

FIG. 7 is similar to FIG. 4 but with the auxiliary detector probe lowered to a subsurface position.

FIG. 8 is like FIG. 6 but showing both the source rod and the auxiliary detector probe in opposed subsurface positions for direct transmission measurements.

FIG. 9 is an elevation cross section taken generally along the lines 9—9 of FIG. 1.

FIG. 10 is a fragmentary plan view with the source rod and guide rod in section and with the top and auxiliary legs removed.

FIG. 11 is an enlarged perspective of the bottom cover plate shown in FIG. 2.

FIG. 12 is an enlarged perspective of the mounting member used to mount the auxiliary detector probe on the housing.

FIG. 13 is a plan view of an indexing and adjusting clamp to support the auxiliary detector probe.

FIG. 14 is a left end elevation view of the clamp.

FIG. 15 is a righthand elevation view of the clamp.

FIG. 16 is a view of the souce rod, handle and guide rod assembly removed from the housing.

FIG. 17 is a partial section view showing the source in a typical non-collimated backscatter position.

FIG. 18 is similar to FIG. 17 but showing the source in a partially collimated position.

FIG. 19 is an exploded view of a cap and spring assembly employed on the top of the source rod.

Referring to the drawings the illustrated gauge includes a housing having an upper section 20 secured to a lower section 21, both sections being formed as lightweight,, thin wall, cast aluminum sections. To the rear and on one side of the housing there is provided a molded cavity 22 having a flat bottom surface 23, a vertical back surface 24, a pair of threaded holes 25 and a hole 27 which extends through the bottom of the gauge (see FIGS. 2 and 3). An anti-rotation pin 30 having a flat guide surface 31 is mounted adjacent cavity 22. The two housing sections are secured together by suitable screws 26.

Cavity 22 receives an assembly consisting of a guide block 35 and guide tube 36 shown enlarged in FIG. 12.

Block 35 is secured by screws 37 being received in the previously mentioned threaded holes 25 and the end of tube 36 extends through to the bottom of the housing as seen in FIGS. 2 and 3. Tube 36 serves to guide the vertical travel of an auxiliary detector probe 40 having a suitable, e.g. Geiger-Mueller, gamma detector 41 (FIG. 7).

The center of volume of detector 41 is identified on auxiliary detector probe 40 by the letters CV. In this regard it will be noted that the invention recognizes the utility of such a detector in a vertical orientation whereas detectors in this type of portable gauge are normally oriented horizontally, this being the case with other detectors later referred to in this description. Since sensitivity is directly related to the volume of detector gas this invention preserves a maximum of sensitivity in the vertical probe configuration by using the longest practicable G.M. tube. Appropriate wires 42 lead from auxiliary detector probe 40 and terminate in a terminal 43 adapted to connect with a further terminal 44, having a removable cap 45, such that the output of detector 41 may be fed to a suitable signal conditioning circuit represented generally by the numeral 50 in FIG. 9 and then from circuit 50 to a suitable scaler or ratemeter, not shown, which may be connected to the gauge output terminal 51 through lead 52.

Auxiliary detector probe 40 is accurately marked such as by the pictured numbers 4, 6, 8, 10 and 12 which numbers correspond to the CV point of detector 41 being at 4 inch, 6 inch, 8 inch, 10 inch or 12 inch levels, respectively, below the surface on which the gauge is resting. To achieve this variation in depth, a clamp 60 shown enlarged in FIGS. 13, 14 and 15 slidably mounts on auxiliary detector probe 40 and rests against the upper edge surface 61 (FIG. 12) of guide tube 36. Clamp 60 comprises a slotted annular body 62 which is tightened and loosened by means of an internally threaded knob 63 and screw 64. Once clamped, clamp 60 and consequently auxiliary detector probe 40 are both prevented from turning by means of the flat surface 49 (FIGS. 13, 15) of clamp 60 engaging the flat surface 31 (FIG. 1) of pin 30. Thus, for example, when the index mark for the number 10 is aligned with the edge 65 of clamp 60 and clamp 60 is clamped as in FIG. 8 the operator knows that the CV point of detector 41 is 10 inches below the surface line 66 on which the gauge is resting. At such location radiation can of course be detected through direct lateral transmission as in FIG. 8 or through direct angular transmission as in FIG. 7. If desired a series of readings can be taken with detector 41 at various subsurface levels. Furthermore, by manufacturing the original gauge housing with cavity 22 already preformed it can be seen that the entire auxiliary detector probe assembly 40 can be supplied as an attachment for any user of the basic gauge who later finds a need for measuring by subsurface detection.

The different gamma mass absorption coefficients of soil forming chemical elements are known to affect accuracy of nuclear gauge density measurements. This so-called "chemical effect" is discussed in a Technical Bulletin entitled "Air-Gap Procedure for Density Measurement" published by the assignee of this invention. For purpose of dealing with chemical effect it is desirable to be able to elevate the gauge to a predetermined height and the gauge of the invention employs a pair of pivoted U-shaped support legs 70, 71 and which form part of the gauge. The terminal ends of each of the legs 70, 71 contains a key-hole shaped slot 73 through which passes a screw 74 around which the ends pivot. It will also be seen that the terminal ends of each of the legs 70, 71 mounts on a hold plate 75 each of which includes three spaced lugs such as lugs 76, 77, 78. As illustrated in FIG. 4, these lugs can hold the legs 70, 71 horizontally and inoperative or as in FIG. 5 in a vertical operative position. While the chemical effect is not fully understood and is under research investigation, it has been the practice in the prior art when taking backscatter soil measurements as in FIG. 4 to use temporary wooden blocks, bricks or the like to support the gauge so that measurements may be obtained both at an elevated "air-gap" position with the gauge bottom surface being in the order of 2.25 inches above the surface being measured as in FIG. 5, and also with the gauge resting on the surface as in FIG. 4 and the chemical effect interpreted by known procedures in the art. With the described legs 70, 71 being a part of the gauge itself and being readily movable to previously and precisely determined vertical, support positions it can be seen that not only is the inconvenience of the operator having to find support blocks and the like avoided but the operator is also assured of being able to achieve repeatable results with the same material.

In addition to the vertically movable and vertically oriented gamma detector 41, the gauge shown in the drawings includes a pair of gamma detectors 80, 81, also of the Geiger-Mueller type, and which are fixed internally and oriented laterally and horizontally at the rear of the gauge. An additional pair of fixed, neutron detectors 82, 83, are located internally and oriented horizontally and longitudinally of the gauge and on either side of the source rod and shielding structure later described. Those familiar with the art will immediately recognize from this and previous description that the gauge of the invention does in fact offer substantially more mode versatility than any gauge of its kind previously found in the art.

Another advantage found in the present invention relates to the source rod 90, its indented guide rod 91 and the carrying and source position control handle 92. In this regard the source 100 is located in a suitable container 101 which is threadably secured to the end of the body 102 of source rod 90, the opposite end 103 being threadably secured to the handle 92. Thus, vertical up and down movement of handle 92 acts to move source 100 correspondingly. It will be noticed however that source rod 90 is not itself required to be indented and thus presents a smooth unbroken external cylindrical surface on the source rod body 102 which can be precision formed of substantially hard, corrosion resistant material, such as stainless steel and which has no tendency to provide points for collecting dirt, small rock or other foregin matter as with prior art constructions in which the source rod itself was indented and used to control source position.

The smooth precision surface of source rod 90 lends itself to a precision mounting arrangement within the major shielding block 121 and which has heretofore been difficult to achieve but nevertheless is vitally necessary for achieving reliable results in nuclear measurements. In particular, the source rod body 102 is arranged for travel in a pair of vertically spaced ball bushings 110, 111 separated by a cylindrical lead shielding sleeve 112, the bushings and a sleeve being tightly mounted by a force fit in a cylindrical aluminum tube 113. Ball bushings 110, 111 provide precision bearing and guide surfaces and preferably are of the recirculating ball type made by Thomson Industries, Inc., of Manhassett, N.Y. A dust cap 114 seals the upper end of tube 113 and tube 113 itself is mounted in a set of superimposed somewhat annular shaped blocks including an upper aluminum support block 120, and a lower lead or other heavy metal shielding block 121 having the usual standardization hole 118. The two blocks are secured together by bolts 109 which in turn are secured to the bottom wall. Additional dust protection is provided by a gasket 119 located between housing section 20, 21. Upper block 120 extends through upper housing section 20 and is sealed by means of a gasket 122.

Block 121 is the major shielding block and provides a central shielded passageway for source rod 90 and in communication with the passageway provides a lower, laterally extending cavity for receiving a sliding shielding block 125 shaped to fit the cavity. A leaf spring 126 is enclosed in a housing 128 having a pliable top 129 (FIG. 9) and secured by screw 127 to upper block 120 and acts to press sliding block 125 inwardly and into the cavity so as to close and shield the source rod passageway from below whenever the source rod 90 is fully withdrawn upwardly. However, it can be seen that when source rod 90 is forced downwardly its bottom end will push against the inclined camming surface 130 of sliding block 125 and cause sliding block 125 to slide on bottom wall 131 out of the cavity to the dotted line position of FIG. 9. This action in turn allows source rod 90 and consequently source 100, to move downwardly so as to bring the source 100 into an operative position. Such operative position may locate the source immediately above the bottom wall 131 for backscatter measuring as in FIGS. 17, 4 and 5 and in which the rays are non-collimated and in which the B index rod indentation is employed. Alternatively the B indentation may be employed so as to locate the source slightly above the bottom wall and so as to partially collimate the rays as in FIG. 18. It will be noted that the depth of sliding block 125 and its sliding action accommodates to both the collimated and non-collimated positions in cooperation with appropriate indexing positions B and B'. As a further alternative the source may be positioned for the FIG. 7 direct transmission mode. A larger downward movement of source rod 90 will of course bring the source 100 to subsurface positions suited to direct transmission measuring modes such as those depicted in FIGS. 6 and 8. It will of course be understood that when source 100 is required only for backscatter measuring, whether with collimated or non-collimated radiation, the bottom wall 131 may be a solid wall, i.e. unbroken and without any kind of aperture. However, in order to give the gauge the versatility of both backscatter and direct transmission capability i.e. as a subsurface type gauge, it is desirable to either provide the bottom wall with a single permanent aperture or to utilize a pair of interchangeable bottom cover plates 135, 136 (FIGS. 2, 3 and 11). Cover plate 135 is provided with an aperture 137 to allow both subsurface and above surface portions of the source 100 and cover plate 136 is made without an aperture so as to present a substantially smooth bottom surface and adapt the gauge solely to backscatter or any direct transmission mode wherein the source itself is not required to be lowered to a subsurface position. Where an aperture is employed in the bottom plate it is particularly desirable to have some means for scraping the source rod to prevent entry of dirt into the interior of the gauge. For this purpose a scraper ring 138 (FIG. 11) is located in the aperture and retained by a spring clip 139.

Sliding block 125 and fixed block 121 both being of lead or some other dense material provide necessary biological shielding. Additional shielding is afforded by laterally extending and longitudinally spaced lead blocks 140 and 141 and the lead cover 142. As a further countermeasure against the previously referred to chemical effect a thin sheet of high density material e.g. lead 143 resides beneath the detectors 80, 81.

It has been previously mentioned that to realize all the advantages of the invention, source 100 should preferably be a combined neutron-gamma source of which many are known in the art. For purposes of neutron reflection and shielding the gauge includes a pair of horizontally disposed and mating polyethylene blocks 150, 151 which reside forwardly and rearwardly of the major shielding block 121 and above neutron detectors 82, 83. Additional neutron shielding is afforded by vertically disposed polyethylene side blocks 152, 153.

Referring back to the interconnected assembly which includes handle 92 and guide rod 91 is provided with a series of indentations 160 shown labelled as 2, 4, 6, 8, 10, and 12 and referring to positions at which source 100 is 2 inches, 4 inches, 6 inches, 8 inches, 10 inches, and 12 inches below the material surface 66 on which the gauge is resting, position B as previously mentioned referring to the non-collimated position where source 100 is immediately above the bottom wall 131 as in FIG. 17 and position B' to a somewhat higher collimated position as in FIG. 18. When handle 92 is moved down it is latched in the desired indentation position which prevents further downward travel and accurately and precisely locates the source for such position. However, any lifting motion on handle 92 will cause handle 92 to unlatch and allow it to slide on guide rod 91 until it has moved to its uppermost transport position in which position source container 101 is above sliding block 125 and sliding block 125 is in a position to provide complete and safe transport shielding below source 100. Thus, whenever handle 92 is used for transporting the gauge or when any attempt is made to move the gauge with the source unshielded, the source 100 is caused to be moved automatically to a safe carrying position. The latching and safety release operation is effected by means of a latch member comprised of a flat bar 180 acting against the pressure of a simple wire spring 161 which tends to push latch member 180 towards the body 102 of source rod 90. Latch member 180 is released by pushing it forward i.e. away from the index rod 91, and releasing is necessary to allow handle 92 to move downwardly, however, as previously mentioned any upward pull on handle 92 will automatically cause latch member 180 to release itself because of the sloped shape of the illustrated indentations 160.

During assembly it is particularly important that the assembly shown in FIG. 16 be located precisely and for this purpose a locating and locking pin 170 passes through a properly placed hole 169 (FIG. 16) in guide rod 91 and fits in upper block 120 so as to lock guide rod 91 and thus the entire FIG. 16 assembly to block 120. Guide rod 91 further includes a hole 171 for receiving a lock i.e. a typical pad lock 175 when it is desired to lock the gauge in its safe, shielded mode during periods of non-use. With regard to guide rod 91 it may also be noted that a removable cap 172 and coil compression spring 173 are mounted in the end of guide rod 91 by means of a pin 174. Cap 172 and compression spring 173 serves as a shock absorbing stop for the uppermost position of handle 92. Compression spring 173 also aids spring 161 to provide additional push on latch 180 in the safe carrying position.

What is claimed is:
1. In a portable nuclear measuring gauge:
    (a) a housing including a top wall with an opening and a flat bottom wall;
    (b) a first shielding block secured to said bottom wall and having a central vertical passageway with a precision bearing surface formed therein and below said passageway having a laterally extending cavity communicating therewith;
    (c) second shielding block means being laterally movable and mating with and spring actuated to occupy said cavity and thereby shield the bottom of said passageway;
    (d) an elongated source rod extending through said top wall opening and having the major body portion thereof formed free of index formations and the like and precision fit to said bearing surface for slidable vertical movement therein, the bottom end of said source rod and a selected upper surface of said second block means being engageable to effect lateral movement of said second block out of said cavity whereby to enable said bottom end to be lowered through said cavity;
    (e) a radioactive source secured to the said bottom end of said source rod;
    (f) a handle extending laterally from and secured to the top end of said source rod and having manually operable detent means mounted thereon;
    (g) a vertically and fixedly positioned elongated guide rod arranged axially parallel to said source rod and having over a length thereof extending above said top wall and equal to the predetermined length of travel of said source rod a plurality of vertically spaced uniform detent index formations adapted to be selectively and releasably engaged by said handle detent means and corresponding to predetermined shielded and operative positions of said source rod, said formations being shaped and said detent means engagement being such that upon any substantial lifting force being asserted on said handle when in an operative position said detent means is released allowing said handle to automatically return said source rod to a position wherein said second block is free to move into said caviety and thereby shield said source;

(h) detector means fixedly mounted in said housing and adapted to detect radiation from said source;

(i) an auxiliary elongated detector probe vertically and adjustably positionable on said housing for movement to selected subsurface positions; and (j) detector means mounted within said auxiliary probe and adapted when in said subsurface positions to detect radiation from said source.

2. In a gauge as claimed in claim 1 wherein said source emits both gamma and neutron radiation, said detector means constitutes a gamma detector and including at least one neutron detector fixedly mounted in said housing thereby enabling precise positioning of both gamma and neutron sources and both gamma and neutron detection in any of said operative positions of said source.

3. In a gauge as claimed in claim 1 including a pair of legs and means secured to said housing and mounting said legs for pivotal movement between a vertical operative and a horizontally inoperative position designed to enable said gauge to be temporarily elevated and thereby establish a predetermined temporary air-gap for chemical-effect purposes.

4. In a gauge as claimed in claim 1 wherein said bottom wall includes an opening opposite said top wall opening, said rod and guide are adapted for movement of said source to selected precisely positioned above surface and subsurface positions, said detector means constitutes a gamma detector and including at least one neutron detector fixedly mounted in said housing thereby enabling above surface detection of neutron and both backscatter and direct transmission detection of gammas from said source.

5. In a gauge as claimed in claim 1 wherein said source rod, handle and guide rod constitute an interconnected assembly and including locking means effective to secure said assembly to said first shielding block.

6. In a gauge as claimed in claim 1 wherein said second block means comprises a single shielding block laterally movable on said bottom wall.

7. In a gauge as claimed in claim 6 wherein said detent index formation includes at least one formation corresponding to a source rod position in which said second block means is out of said cavity and said source is sufficiently above said bottom wall but less than in a shielded position so as to provide a source position allowing partial collimation of the radiation therefrom.

8. In a gauge as claimed in claim 1 wherein said bottom wall includes an opening opposite said top wall opening and said source rod and guide rod are adapted for movement of said source to selected subsurface positions thereby enabling in the same said gauge back scatter detection with said fixed detector means, direct transmission detection with said fixed detector means and with said auxiliary detector means direct transmission detection from both above surface and subsurface positions of said source.

9. In a gauge as claimed in claim 1 including means adapted to prevent rotation of said auxiliary probe around its own longitudinal axis while maintaining the vertical adjustability thereof.

References Cited

UNITED STATES PATENTS

| | | | |
|---|---|---|---|
| 2,249,050 | 7/1941 | Schmidt | 254—111 X |
| 2,675,482 | 4/1954 | Brunton | 250—83.3 X |
| 3,256,434 | 6/1966 | Carver | 250—106 X |
| 3,353,023 | 11/1967 | Lowery et al. | 250—106 |
| 3,372,281 | 3/1968 | Auld et al. | 250—106 |

FOREIGN PATENTS

| | | | |
|---|---|---|---|
| 863,886 | 3/1961 | Great Britain | 250—83.6 |

RALPH G. NILSON, Primary Examiner

D. L. WILLIS, Assistant Examiner

U.S. Cl. X.R.

250—83, 83.1